UNITED STATES PATENT OFFICE.

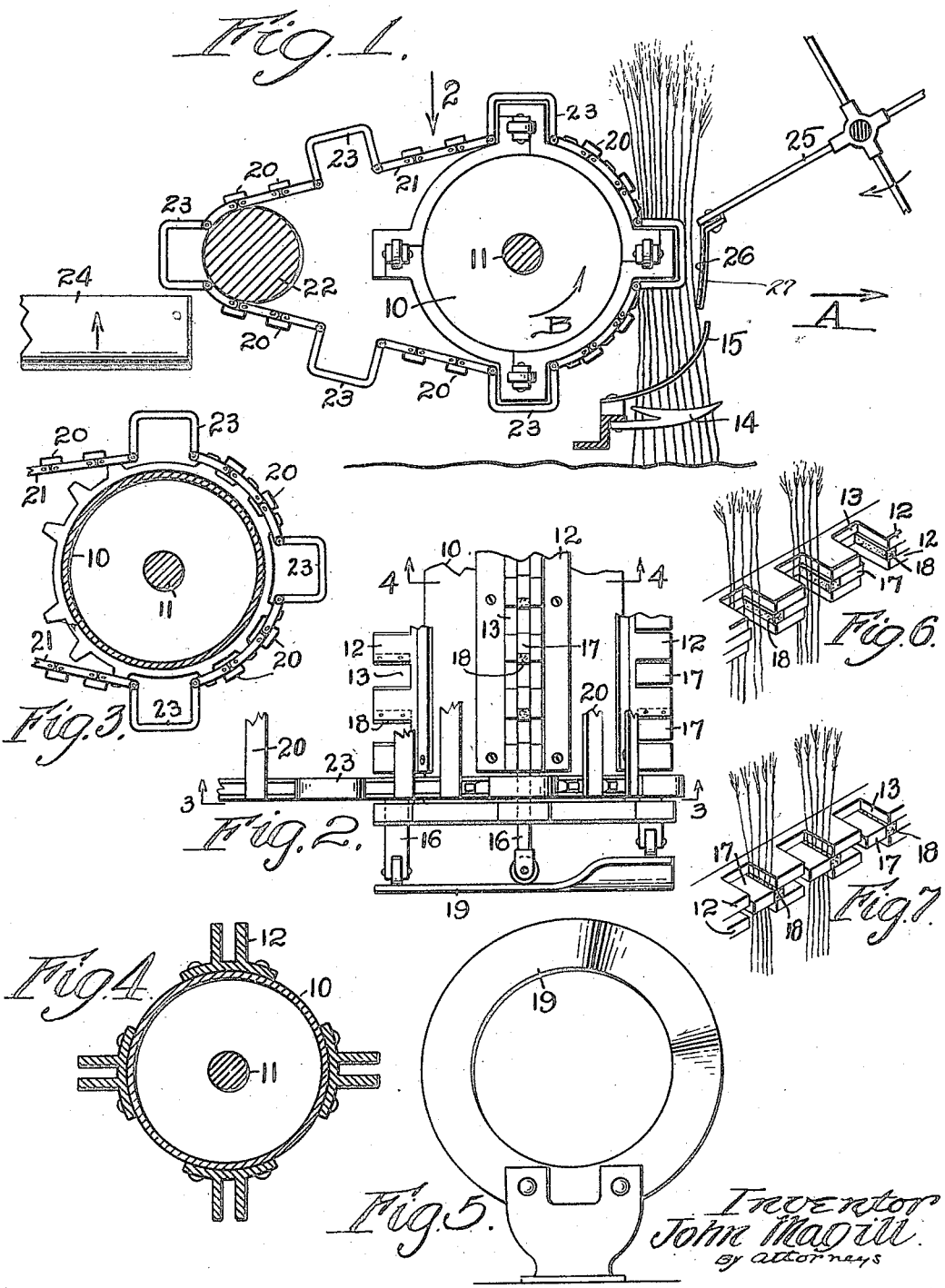

JOHN MAGILL, OF MILFORD, MASSACHUSETTS.

FLAX-PULLING MECHANISM.

1,403,262.

Specification of Letters Patent. Patented Jan. 10, 1922.

Application filed October 12, 1920. Serial No. 416,472.

*To all whom it may concern:*

Be it known that I, JOHN MAGILL, a citizen of the United States, residing at Milford, in the county of Worcester and State of Massachusetts, have invented a new and useful Flax-Pulling Mechanism, of which the following is a specification.

This invention relates to mechanism for harvesting flax by pulling the stalks bodily from the ground. This operation has been heretofore commonly performed by manual labor at an increasing expense of time and money. It is the general object of my invention to provide mechanism by which the operation may be performed mechanically in an entirely satisfactory manner and with greatly decreased expense. The mechanism shown in the drawings is designed to be substituted for the usual cutting mechanism in a grain harvester of ordinary type but special complete flax pulling machines may be built if desired.

My invention relates particularly to improved gripping devices and to certain arrangements and combinations of parts hereinafter described and more specifically pointed out in the appended claims.

A preferred form of the invention is shown in the drawings in which

Fig. 1 is a side elevation of my improved flax pulling mechanism, the operating cam being removed;

Fig. 2 is a partial plan view of the mechanism;

Figs. 3 and 4 are sectional elevations taken along the lines 3—3 and 4—4 in Fig. 2;

Fig. 5 is a detail side view of one of the operating cams; and

Figs. 6 and 7 are detail diagrammatic views illustrating the operation of the mechanism.

Referring to the drawings, I have shown a cylinder 10 rotatable upon a bearing shaft 11 and provided on its outer surface with a plurality of parallel longitudinal guide bars 12. Suitable driving connections (not shown) are provided between the cylinder 10 and the drive wheel of the harvester. The bars 12 are slotted as indicated at 13 in Figs. 6 and 7, and the stalks of flax are parted and guided into the slots 13 by parting teeth 14 and guide plates 15.

A clamping or gripping bar 16 is mounted to slide between each pair of guide bars 12 and is provided with projections 17, corresponding in number to the slots 13. A rubber block or cushion 18 is fixed between the guide bars 12 adjacent each slot 13.

The clamping bars 16 are provided with cam rolls at each end thereof co-operating with cam plates 19 fixed to the frame work which supports the bearings of the cylinder 10. These cam plates are so formed that each clamping bar 16 is moved endwise to clamp the flax as soon as the flax has entered the slots 13 in the associated guide bars 12. Each bar 16 is held in this position as the cylinder revolves, raising the flax and pulling it from the ground.

The flax is released as it passes over the top of the cylinder and is removed by the slats of a carrier 20 mounted on chains 21 driven by sprocket teeth on the cylinder 10 and passing around a smaller guide roll 22. The chains 21 are preferably provided with enlarged U-shaped links 23 which provide clearance for the guide bars 12 as the chains pass around the cylinder 10. As the flax is gripped outside of the carrier 20 it is positively removed from the cylinder as the carrier advances.

The flax is deposited by the carrier 20 upon a cross belt 24 by which it may be conveyed to the usual assembling and binding mechanism of a grain harvester. A reel 25 is preferably provided to push the stalks yieldingly into the slots 17 and for this purpose each arm of the reel may be equipped with a flexible canvas wiper 26, stiffened, if desired, by ribs 27.

The machine is drawn or pushed through the flax in the direction of the arrow A in Fig. 1 and the cylinder 10 is simultaneously rotated in the direction of the arrow B. The flax is guided into the slots 17 by the teeth 14 and guides 15 assisted by the reel 25, and when duly positioned in the slots it is grasped and held therein by the clamping bars 16. The flax is thus pulled from the ground by the upward movement of the cylinder and clamping bars and is transferred by the slat carrier 20 and the belt conveyor 24 to suitable assembling and binding mechanism. The pulling operation is thus quickly and economically performed and the usual hand labor is entirely avoided.

Having thus described my invention, it will be evident that changes and modifications can be made therein by those skilled in the art within the spirit and scope thereof as set forth in the claims and I do not wish to be otherwise limited to the details herein disclosed but what I claim is:—

1. Flax pulling mechanism comprising a rotated cylinder, a plurality of axially movable flax gripping members mounted thereon, and a pair of fixed cams directly engaging and longitudinally reciprocating said members positively in both directions as the cylinder is rotated, to grip and thereafter release the flax.

2. Flax pulling mechanism comprising a rotated cylinder having a plurality of pairs of notched guide bars fixed thereto and extending axially thereof, a notched clamping bar slidable between each pair of said guide bars, and means to move said clamping bars longitudinally to alternately grip and release the flax.

3. Flax pulling mechanism comprising a rotated cylinder having a plurality of sets of slotted guide bars extending axially thereof, clamping bars slidable between said guide bars, and means to move said clamping bars longitudinally to alternately grip and release the flax, said clamping bars having projections thereon, each co-operating with a portion of cushion material fixed between said guide bars.

4. Flax pulling mechanism comprising a rotated cylinder, a flax carrier movable therewith, and means movable axially of said cylinder to grip and pull the flax and to thereafter deposit the flax on said carrier.

5. Flax pulling mechanism comprising a rotated cylinder, a flax carrier movable therewith, and means movable axially of said cylinder to grip and pull the flax and to thereafter deposit the flax on said carrier, said carrier being formed with driving chains having U-shaped links inserted therein to clear said gripping means.

6. Flax pulling mechanism comprising a rotated cylinder, a slat conveyor running over said cylinder, and devices on said cylinder effective to grip and thereafter release the flax outside of said conveyor, the slats of said conveyor clearing away the flax from said gripping devices as it leaves the surface of the cylinder.

In testimony whereof I have hereunto affixed my signature.

JOHN MAGILL.